H. C. Briggs,
Wheel Cultivator.

No. 87,627. Patented Mar. 9, 1869.

Witnesses
Chas. Nida
Ara M. organ

Inventor
H. C. Briggs.
per Mmmm
Attorneys

UNITED STATES PATENT OFFICE.

HORACE C. BRIGGS, OF WEST AUBURN, MAINE.

Letters Patent No. 87,627, dated March 9, 1869.

IMPROVEMENT IN HOEING-MACHINE.

The Schedule referred to in these Letters Patent and making part of the same.

*To all whom it may concern:*

Be it known that I, HORACE C. BRIGGS, of West Auburn, in the county of Androscoggin, and State of Maine, have invented a new and useful Improvement in Hoeing-Machines; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to improve the construction of my improved hoeing-machine, patented, November 17, 1868, and numbered 84,165, so as to make it more convenient and effective in use; and It consists in the construction and combination of various parts of the machine, as hereinafter more fully described.

A is the front or longer cross-bar;
B is the rear or shorter cross-bar;
C are the adjustable longitudinal bars;
D are the runners;
E are the adjustable knees;
F are the adjustable brace-rods;
G are the curved parts, or pieces, formed upon or attached to the horizontal parts of the runners; and
H are the draught-irons.

All of these parts are constructed and combined in accordance with patent, No. 84,165.

Figure 1:
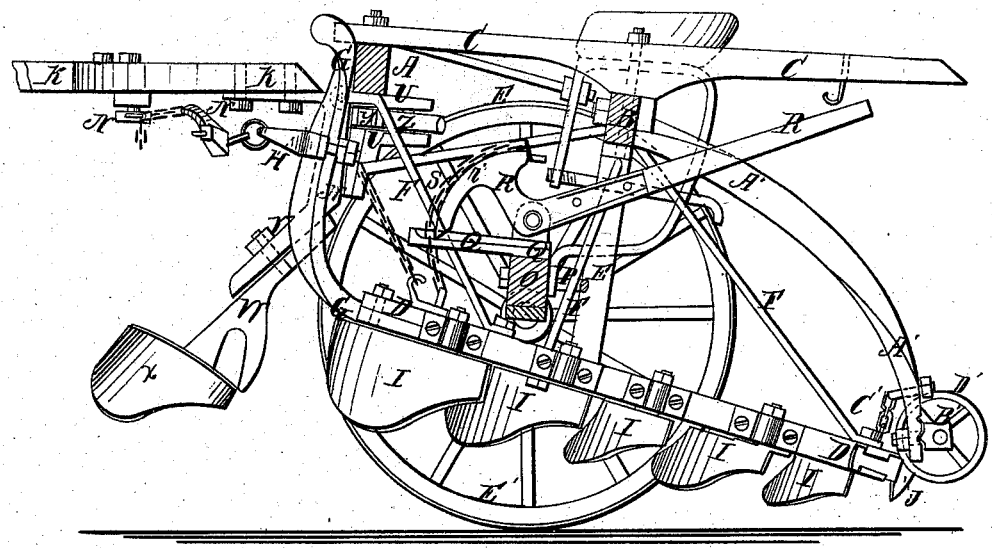
Figure 1 is a side view of my improved machine, partly in section, to show the construction.
Figure 2:
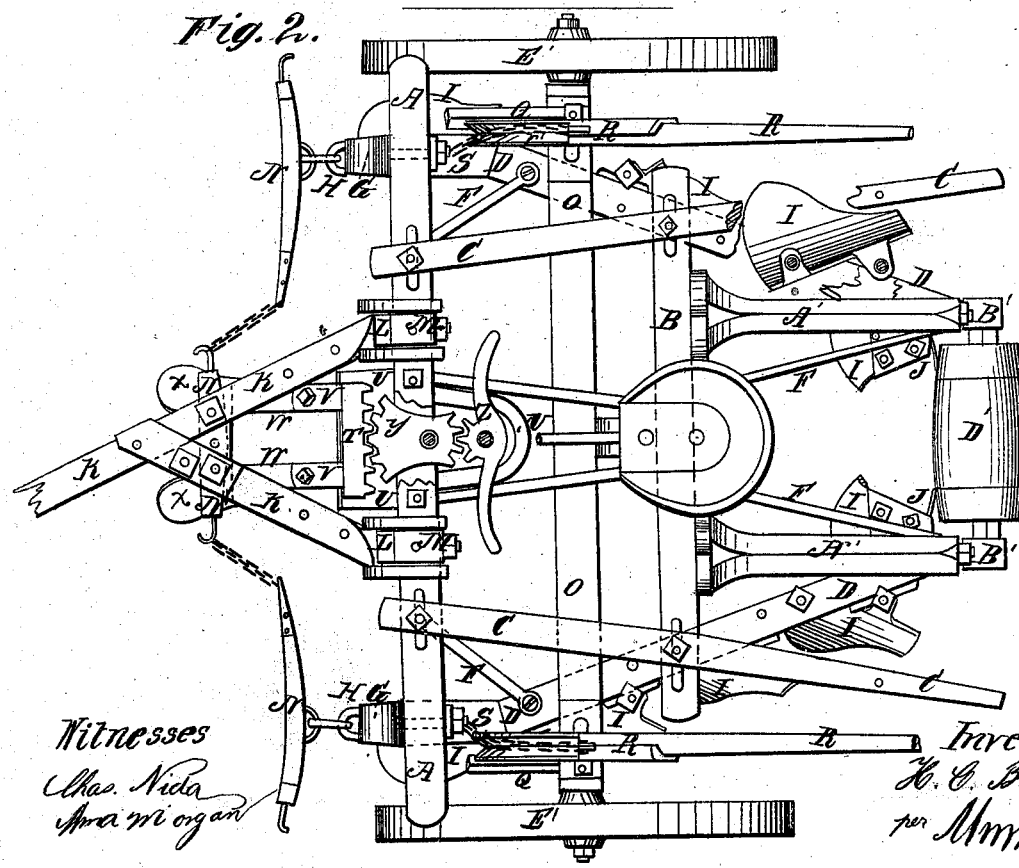
Figure 2 is a top or plan view of the same, parts being broken away, to show the construction.

I are the plows, which are made in about the form shown in figs. 1 and 2, so as to cut up the weeds, stir and turn over the ground, moving the soil toward or from the plants, according to the adjustment of said plows.

The plows I are formed with ears upon their upper edges, by means of which they are secured to the runners D, by bolts, passing, the one through eyes, attached to the outer sides of the runner D, and the other passing through one or the other of the holes formed for it in the said runners D, according as it is desired to turn the soil toward or from the plants.

In the case of the rear plows I, both bolts pass through ears, attached to the inner sides of the rear ends of the runners D, as shown in fig. 2.

J are inwardly-projecting hoes, the shanks of which enter and are adjustably secured, by set-screws, in grooves formed in caps, attached to the rear ends of the runners D, so that the said hoes may be adjusted to throw the soil more or less closely around the plants, as may be desired.

K is the tongue, which is hinged to the lower part of the forward side of the front cross-bar A, and the play of which is limited by the slotted wedge-blocks L, which are adjustably secured to the forward side of the bar A, by bolts passing through said bar, or through keepers, or blocks M, attached thereto, and which support the upper ends of said wedges.

The pole of the tongue K is inclined to one side, and its rear end is strongly braced, to adapt the machine for use with one horse. When two horses are to be used, the tongue K should be straight.

N is the draw-bar, which is made in three parts, the central part being pivoted to the tongue, and the end parts being connected with the draw-irons H.

The inner ends of the end parts of the draw-bar N are connected with the ends of the central part by short chains, as shown in fig. 1, the draught being applied to the outer end of said end parts.

This construction of the draw-bar protects the plants, while being cultivated, from any liability to be injured by the draught-bar.

O is an axle, upon which work the wheels E, and which passes across the machine, above the runners D, and below the bars C, and is connected with the frame of the machine by adjustable keepers, P, which pass around the central brace-rods F, and through slots in the said axle O, so that the frame of the machine may be conveniently raised and lowered upon the said axle, when desired.

To the upper side of the axle O, near its ends, are attached arms, Q, projecting forward, and having projections formed upon their rear ends, directly over the axle O, to which projections are pivoted the angles of the bent levers R, the long arms of which extend up into such a position as to be conveniently reached and operated by the driver from his seat.

Upon the end of the short arms of the bent levers R, are formed curved segments r', having a groove upon their convex faces.

To the upper end of the segmental arms r' are attached the upper ends of the chains S, the lower ends of which are connected with the runners D, so that, by operating the levers R, the entire frame-work of the machine may be raised from the ground. When raised from the ground, the frame-work of the machine is held suspended, by allowing the lower ends of the segmental arms r' to rest upon the forward ends of the arms Q, as shown in fig. 1.

The machine may be used with or without the wheels and axle, and hoisting-device, if desired.

T is a bar, having teeth formed upon its rear edge, and which bar slides longitudinally in a recess between two plates, U, attached to the under side of the middle part of the front cross-bar A.

To the under side of the ends of the bar T are attached, or upon them are formed, downward-projecting arms, V, to the lower ends of which are attached the upper ends of the standards W, to the lower ends of which are attached the plows, or hoes X, said lower ends being formed with two seats for the plows, so that they may be adjusted to turn the soil from or toward the plants, as may be desired.

Y is a plate, pivoted to and between the plates U.

Upon the forward edge of the plate Y are formed teeth, which mesh into the teeth of the bar T, and upon the rear edge of the plate Y are formed teeth, into which mesh the teeth formed upon the forward side of the middle part of the foot-lever Z, which is also pivoted to and between the plates U, in such a position that the driver's feet may rest upon the ends of the said lever Z, to guide the plows X with his feet, in cultivating crooked rows, or in avoiding irregular hills.

To the rear side of the rear cross-bar B are attached the upper ends of the arms A', and the lower ends of which are slotted, to receive the bolts by which the journal-boxes B' are secured in place, said journal-boxes B' being made with an angle or projection upon their inner side, to enter one or the other of the notches formed in the rear sides of the lower ends of the arms A', as shown in fig. 1.

The lower ends of the arms A' may be connected with the rear ends of the runners D by short chains C'.

D' is a roller, the journals of which work in the boxes B', as shown in figs. 1 and 2.

The roller D' is designed to be used when the machine is used as a planter, in which case a seed-hopper may be attached to the frame of the machine, and operated to drop the seed by any of the well-known means for that purpose.

When the machine is to be used as a cultivator, the roller D' and arms A' should be detached.

Having thus described my invention,

I claim as new, and desire to secure by Letters Patent—

1. The combination of the axle O and wheels E' with the frame A B C D E F of the cultivator, substantially as herein shown and described, and for the purpose set forth.

2. The combination of the arms and supports Q, levers R r', and chains S, with the axle O and runners D, substantially as herein shown and described, and for the purpose set forth.

3. The combination of the foot-lever Z, pivoted toothed plate Y, toothed bar T, arms V, standards W, and plows, or hoes X, with each other, and with the forward cross-bar A of the cultivator-frame, substantially as herein shown and described, and for the purpose set forth.

4. Forming the standards W with two separate and distinct seats, for the plows, or hoes, substantially as herein shown and described, and for the purpose set forth.

5. The draught-bar N, constructed in three parts, and operating in connection with the tongue K and draught-irons H, substantially as herein shown and described, and for the purpose set forth.

6. The combination of the roller D' and detachable arms A' with the rear cross-bars B and runners D of the cultivator-frame, substantially as herein shown and described, and for the purpose set forth.

7. The combination of the adjustable wedge-block L with the forward cross-bar A and inclined rear end of the tongue, substantially as herein shown and described, and for the purpose set forth.

The above specification of my invention signed by me, this 11th day of January, 1869.

HORACE C. BRIGGS.

Witnesses:
GEO. S. WOODMAN,
AMMI C. READ.